United States Patent [19]

Fitzpatrick

[11] 4,396,192
[45] Aug. 2, 1983

[54] POOL BALL

[75] Inventor: Larry G. Fitzpatrick, Marion, Va.

[73] Assignee: Brunswick Corporation, Skokie, Ill.

[21] Appl. No.: 302,829

[22] Filed: Sep. 16, 1981

[51] Int. Cl.³ ............................................. A63B 47/00
[52] U.S. Cl. ...................................... 273/59 B; 40/327
[58] Field of Search ................. 273/59 R, 59 A, 59 B, 273/213, 58 A, 58 G, 11 R, 11 C, 122 A, 125 A

[56] References Cited

U.S. PATENT DOCUMENTS

| | | | |
|---|---|---|---|
| 3,362,710 | 1/1968 | Feddick et al. | 273/59 X |
| 3,547,439 | 12/1970 | Feddick | 273/59 R |
| 3,738,655 | 6/1973 | Feddick et al. | 273/59 A |
| 3,937,467 | 2/1976 | Benson et al. | 273/59 R |
| 4,116,439 | 9/1978 | Chavarria et al. | 273/59 B X |
| 4,214,753 | 7/1980 | Haber et al. | 273/59 R |

Primary Examiner—George J. Marlo
Attorney, Agent, or Firm—William G. Lawler, Jr.

[57] ABSTRACT

A cue ball has a metal insert therein in the form of a ring having a center of mass coinciding with the geometric center of the cue ball. The body of the cue ball is formed of a nonmetallic material in a conventional ball mold. A locating insert is formed of the same nonmetallic material as the body of the ball and has a solid cylindrical body about the center of which a thin strip of metal material is wrapped forming a ring. The insert with the metal ring disposed thereon is positioned within the ball mold along a diameter thereof with an outermost end of the insert resting on the inner surface of the mold. In one embodiment, the locating insert includes an annular groove extending about the cylindrical body and in which the metal is wrapped. The length of the insert from an outermost end of the insert to the center of the annular groove is equal to the radius of the ball mold. In another embodiment, the locating insert includes a cylindrical body with a length equal to the width of the metal strip and shafts of reduced cross-sectional area extending outwardly therefrom along the longitudinal axis of the cylindrical body. The length of the insert from the outermost ends of the shafts to the center of the cylindrical body about which the metal is wrapped is equal to the radius of the ball mold.

8 Claims, 6 Drawing Figures

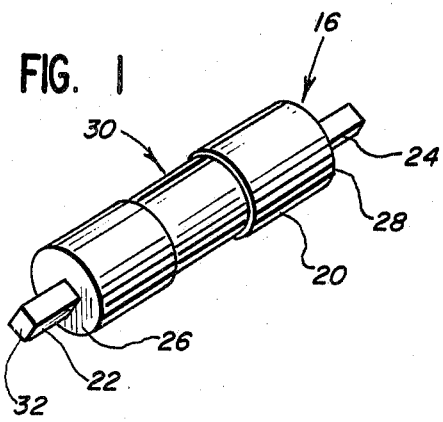
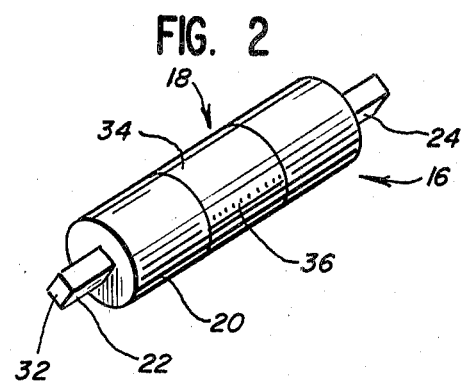
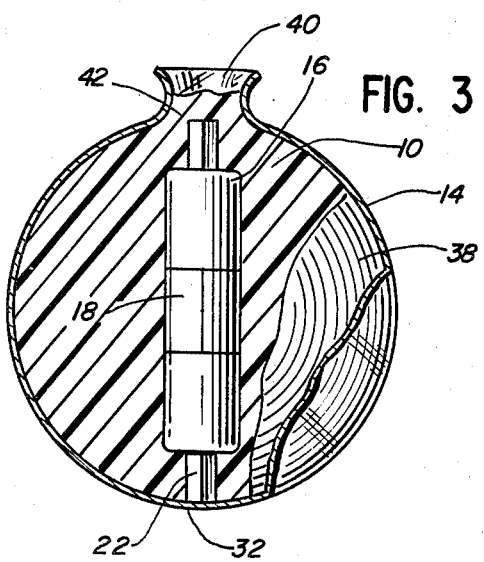
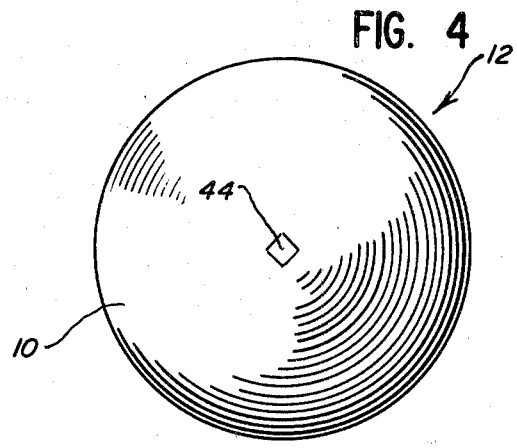
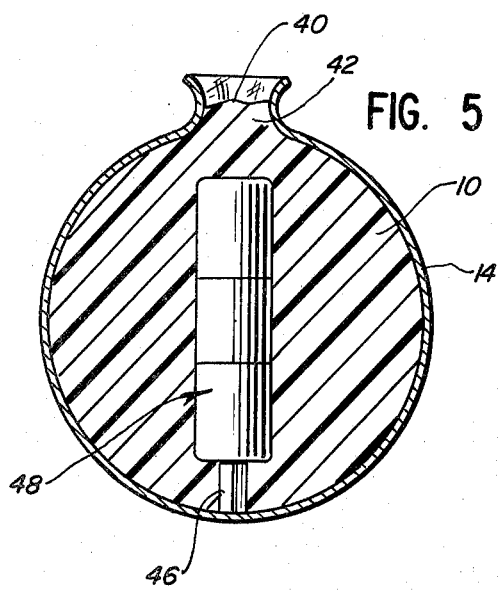
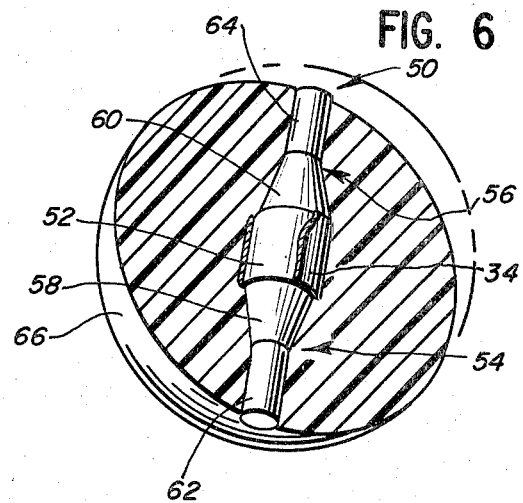

POOL BALL

BACKGROUND OF THE INVENTION

This invention relates to a pool ball having a spherical body of nonmetallic material and a metal insert in the form of a ring and to a method of making the pool ball such that the center of mass of the metal insert coincides with the geometric center of the pool ball.

Coin operated pool tables typically include passageways leading from each of the pockets to a locked compartment for retaining the pool balls as they are knocked into the pockets during the progress of a game. The compartment remains locked until a coin of proper denomination is deposited at which time the compartment opens to provide access to the pool balls therein. A cue ball for use in such coin operated pool tables must be separated from the object balls and prevented from entering the locked compartment in the event that the cue ball has been inadvertently scratched or knocked into one of the pockets during the progress of the game.

Known methods of separating cue balls include providing a cue ball which is of a different size or weight than the object balls, detecting the difference mechanically and preventing the cue ball from entering the locked compartment. This has been found unacceptable since it is desirable that the cue ball have the same physical characteristics as the object balls.

Another known method of separating the cue ball includes providing a cue ball having an insert of magnetic material located within the ball as near as possible to the surface thereof so that the cue ball may be directed into an unlocked compartment by means of a magnet. As shown in U.S. Pat. No. 3,738,655, the magnetic cue ball may be formed having a hollow sphere of magnetic material with a perforation therein. A plastic resin is poured into the hollow sphere through the perforation to form a core. The core is then encapsulated in a shell of the plastic resin to form the cue ball. Another method of making a magnetic cue ball includes molding plastic resin about a spherical cage formed of uniformly spaced steel strips. A magnetic cue ball may further be formed of a sphere of plastic resin having grooves therein. Strips of magnetic material are disposed within the grooves and the grooves filled with plastic resin to the outer surface of the ball.

Still another method of separating a cue ball is to provide an induction coil located about a central passageway of the pool table and through which all of the pool balls roll. Downstream of the induction coil, the central passageway branches off into a passageway leading to the locked compartment for object balls and a passageway leading to an unlocked compartment for the cue ball. When a cue ball having a metal insert therein rolls through the induction coil, the field produced by the coil is affected such that the output of the coil signals an electronic circuit which actuates a mechanical kicker or the like disposed in the central passageway near the point at which the passageway branches off. The kicker when actuated knocks the cue ball into the passageway leading to the unlocked compartment. Known cue balls for use with an induction coil separating system have been formed with a solid spherical core of metal such as aluminum or the like and about which a plastic resin is molded.

Numerous problems have arisen in manufacturing cue balls having metal inserts therein as described above. One of the most apparent problems arises in centering the insert within the cue ball to provide a balanced ball having a true roll. The known methods of centering a solid spherical metal insert or an insert in the form of a spherical cage are complex, costly and often inaccurate.

Further, where it is desired to provide a cue ball of approximately the same weight as the object balls, the density of the metal material forming the insert has been a crucial design factor in manufacturing known cue balls with metal inserts. Because large quantities of metal are used to form the inserts, the density of the metal must be approximately equal to the density of the plastic resin forming the remainder of the ball. Therefore, only a limited number of metals having an appropriate density could heretofore be used.

SUMMARY OF THE INVENTION

In accordance with the present invention, the disadvantages of prior cue balls having metal inserts therein and the methods of making such cue balls have been overcome.

The cue ball of the present invention includes a spherical body of nonmetallic material having a thin metal insert in the form of a ring, the center of mass of the metal ring coinciding with the geometric center of the ball to provide a balanced ball, the size and weight of which are equal to that of the object balls. Because such a small amount of metal is used to form the metal ring, the density of the metal is not a crucial factor in obtaining a ball of standard weight.

The method of making the cue ball of the present invention utilizes a conventional glass ball mold having a generally spherical shape and in which the body of the cue ball is formed of a nonmetallic material. A locating insert is formed of the nonmetallic material of which the body of the ball is to be formed and has a solid cylindrical body about the center of which a thin strip of metal is wrapped, forming the metal ring. The length of the locating insert from an outermost end to the center about which the metal ring is disposed is equal to the radius of the glass ball mold. The insert is positioned in the ball mold along a diameter of the mold with an end of the insert resting on the inner surface thereof so that the center of mass of the metal ring coincides with the geometric center of the spherical ball mold. The nonmetallic material is then poured into the mold about the insert to form the ball.

In one embodiment, the locating insert has an annular groove formed therein and about which the metal strip is wrapped, the length of the insert from an outermost end of the cylindrical body to the center of the annular groove being equal to the radius of the ball mold. When the metal strip is wrapped about the annular groove and the insert disposed in the glass mold as described above, the metal ring is accurately centered.

In another embodiment, the locating insert is formed with a cylindrical body and shafts of reduced cross-sectional area extending outwardly from the ends thereof, the cylindrical body having a length equal to the width of the metal strip. The length of the insert from the outermost ends of the shafts to the center of the cylindrical body about which the metal is wrapped is equal to the radius of the glass ball mold.

The locating insert may be formed of a nonmetallic material having a different color than the remainder of the ball so that the cross-section of the ends of the insert provide a distinguishing marking of a desired shape and size for the cue ball.

Further advantages of the invention will be readily apparent from the following specification and from the drawings in which:

FIG. 1 is an enlarged view of the locating insert of the present invention;

FIG. 2 is an enlarged view of the locating insert of FIG. 1 having a metal ring disposed thereon;

FIG. 3 is a sectional view of the cue ball of the present invention formed in a mold;

FIG. 4 is an enlarged view of the finished cue ball

FIG. 5 is a sectional view of another embodiment of the cue ball formed in a mold;

FIG. 6 is a sectional view of a cue ball having another embodiment of the locating insert.

As seen in FIGS. 1–4, the body 10 of a cue ball 12 of the present invention is formed of a nonmetallic material such as a phenolic resin poured into a conventional glass ball mold 14 having a generally spherical shape. A locating insert 16 formed of the same nonmetallic material as the body 10 of the ball is provided to accurately center a metal ring 18 within the ball such that the center of mass of the ring 18 coincides with the geometric center of the ball 12.

The locating insert 16 may be molded or machined having a solid cylindrical body 20 and shafts 22 and 24 extending outwardly from respective ends 26 and 28 along the longitudinal axis of the body 20. An annular groove 30 extends about the center of the cylindrical body 20, the groove having a depth equal to the thickness of the metal ring 18 and a width equal to the width of the ring. The length of the insert from an outermost end 32 of the shaft 22 to the center of the annular groove 30 is equal to the inner radius of the ball mold 14.

As seen in FIG. 2, a thin strip of metal material 34 is wrapped about the annular groove 30 to form the metal ring 18. The length of the metal strip 34 is approximately ¼" greater than the circumference of the annular groove 30 so that the ends of the metal strip may be overlapped and crimped together as shown at 36 to securely hold the metal ring 18 in position about the insert 16.

The locating insert 16 with the metal ring 18 secured thereon is suspended within the glass ball mold 14 by conventional methods such that the insert is positioned along a diameter of the mold with the end 32 of the shaft 22 resting on the inner surface 38 of the mold. Liquid phenolic resin is poured through an opening 40 of the mold 14 about the insert 16. The filled mold is then heat cycle cured to a specific hardness after which the glass ball mold 14 is broken off the raw ball. The excess sprue resin 42 formed by the opening 40 of the mold 14 is removed by a chuck grinder. The raw ball is then ground in a centerless grinder to provide the finished spherical ball 12.

Because the length of the insert 16 from the end 32 to the center of the annular groove 30 and thus the center of the metal ring 18 is equal to the radius of the ball mold 14, when the insert is positioned within the mold as described above, the center of mass of the metal ring coincides with the geometric center of the ball 12 providing a balanced ball with a true roll.

The cue ball 12 of the present invention is particularly suitable for coin operated pool tables having an induction coil cue ball detection and separating system. In order to detect the cue ball the metal insert must be sufficiently close to the outer surface of the ball since the resin comprising the body 10 of the ball acts as an insulator. It has been found that for a cue ball of standard size with a 2¼" diameter, a ring 18 having a diameter of ⅝" or greater, a width of about ⅝", and made of a ferrous metal such as Mu metal of approximately 80% nickel and 11–12% iron is easily detectable by an induction coil.

Further, the metal ring 18 may be extremely thin, having a thickness of about 0.001". Because such a small amount of metal is used to form the ring 18, the weight of the cue ball 12 is not affected by the weight of the metal insert. A standard weight cue ball of 6 ounces made in accordance with the present invention may be obtained by using a resin having approximately the same density as the resin used in forming conventional pool balls.

The insert 16 may be formed of a resin having a color different from the resin forming the body 10 of the ball so that the cross-section of the shafts 22 and 24 form a distinguishing mark 44 on the surface of the ball 12. The shafts 22 and 24 have a reduced cross-sectional area as compared to that of the cylindrical body 20 to provide a mark 44 as small in size as desired. Further, the shafts may have a cross-section of any desired shape such as a circle or a diamond to provide the distinguishing mark 44.

The insert 16 as shown in FIGS. 1–3 provides two distinguishing marks 44 on the outer surface of the ball 12 due to the shafts 22 and 24. Where only one mark 44 is desired, the insert may be formed having only one shaft 46 as shown for the insert 48 of FIG. 5. The insert 48 is identical to the insert 16 with shaft 24 eliminated. The insert 48 may be positioned within the ball mold 14 along a diameter of the mold by conventional techniques.

Another embodiment of a locating insert 50 is shown in FIG. 6. The locating insert 50 includes a solid cylindrical body 52 having a diameter of ⅝" or greater and a length equal to the width of the strip of metal 34 positioned thereon to form the metal ring. Shafts 54 and 56 extend outwardly from the cylindrical body 52 along its longitudinal axis. The shafts 54 and 56 have portions 58 and 60 in the form of truncated cones, the smaller bases of which abut cylindrical ends 62 and 64. The length of the insert 50 from the outermost end of a shaft 54, 56 to the center of the cylindrical body 52 and thus the center of the metal ring disposed thereon is equal to the radius of the glass ball mold so that the center of mass of the metal ring will coincide with the geometric center of the cue ball 66. The cue ball 66 having the locating insert 50 is formed in the same manner as described with reference to FIGS. 3 and 4 for the insert 16.

I claim:

1. In a pool ball having a spherical body of nonmetallic material, an insert comprising:

a locating insert of nonmetallic material having a solid cylindrical body and at least one shaft of reduced cross-sectional area extending outwardly from and on the longitudinal axis of the cylindrical body, the length of the locating insert from an outermost end of the shaft to the center of the cylindrical body being equal to the radius of the pool ball, the insert being disposed within the spherical body of the pool ball along a diameter of the ball; and a thin strip of metal material annularly wrapped about the center of the cylindrical body to form a metal ring having a center of mass coincident with the geometric center of the pool ball.

2. The pool ball of claim 1 wherein the outermost end of the shaft forms a distinguishing mark on the outer surface of the pool ball.

3. The pool ball of claim 1 wherein the diameter off the metal ring is at least ⅝".

4. The pool ball of claim 1 wherein the metal material forming the ring is ferrous.

5. The pool ball of claim 1 wherein the metal ring has a thickness of approximately 0.001".

6. The pool ball of claim 1 wherein the non-metallic material of the locating insert is a plastic resin.

7. The pool ball of claim 1 wherein the cylindrical body of the insert includes an annular groove, the annular groove having a width equal to the width of the metal ring and the geometric center of the groove coinciding with the geometric center of the cylindrical body, the strip of metal being wrapped about the annular groove.

8. The pool ball of claim 1 wherein the length of the cylindrical body is equal to the width of the metal ring.

* * * * *